Figure 1:
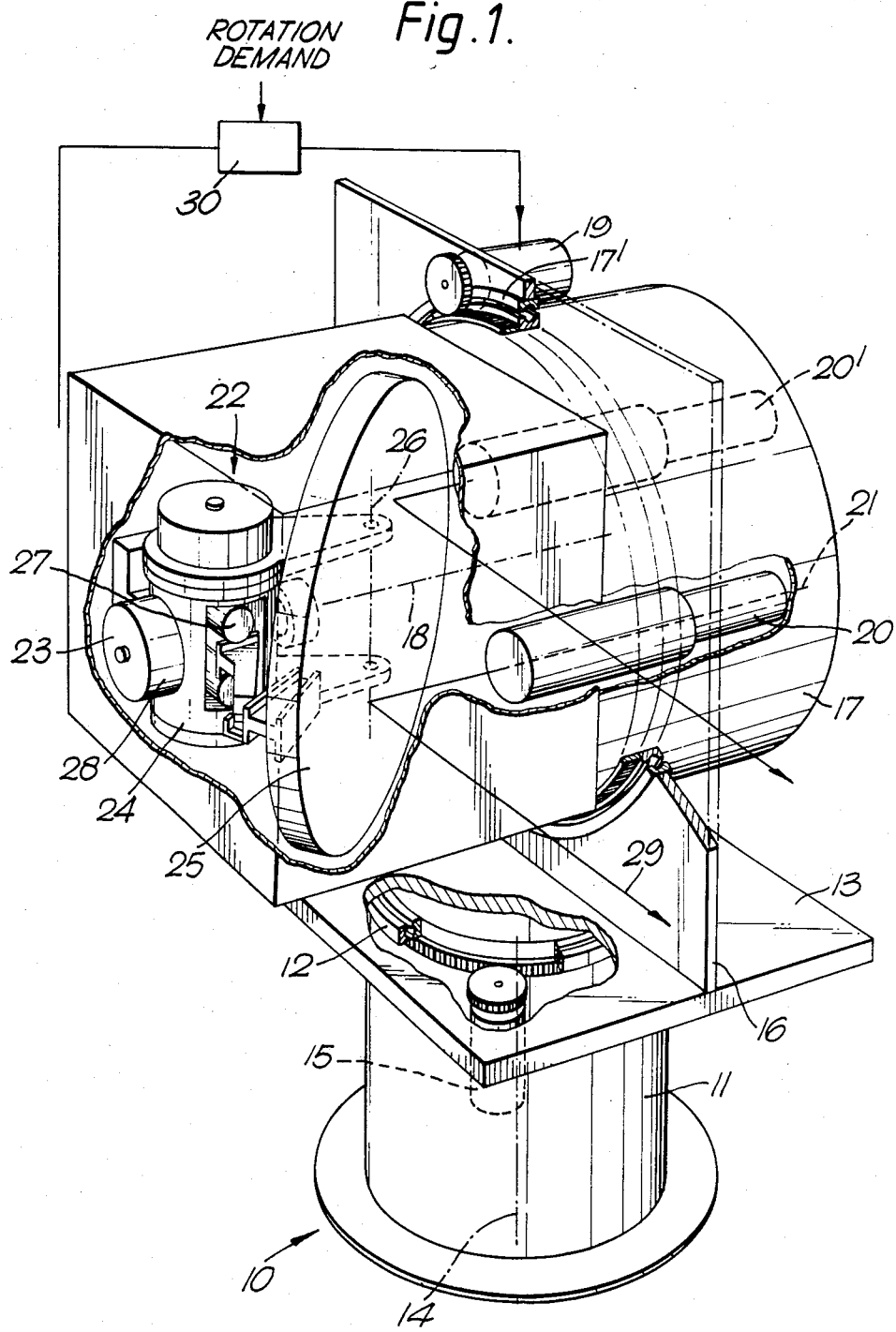

United States Patent

Brignall

[11] Patent Number: 4,643,539
[45] Date of Patent: Feb. 17, 1987

[54] SIGHTLINE STABLISATION APPARATUS

[75] Inventor: Nicolas L. Brignall, Edinburgh, Scotland

[73] Assignee: Ferranti, plc, England

[21] Appl. No.: 666,638

[22] Filed: Oct. 31, 1984

[30] Foreign Application Priority Data

Nov. 4, 1983 [GB] United Kingdom ............ 8329460

[51] Int. Cl.$^4$ ................... G02B 27/64; G02B 13/16
[52] U.S. Cl. ................................. 350/500; 358/225
[58] Field of Search ............. 350/500, 538; 358/109, 358/225

[56] References Cited

U.S. PATENT DOCUMENTS 3,634,622 1/1972 Wheeler ..................... 358/109

Primary Examiner—John K. Corbin
Assistant Examiner—Vincent J. Lemmo
Attorney, Agent, or Firm—Kerkam, Stowell, Kondracki & Clarke

[57] ABSTRACT

In known sightline stabilizing apparatus 10 (FIG. 1) a gyro-stabilized reflector 25 maintained in orientation in space about two axes 18 and 26 by gyro means in the mechanism 22. The reflector mechanism is contained in housing 17 and is pivotable about elevation axis 18 in relation thereto. The housing also carries a sensor, e.g. a tv camera providing signals to a remote (non-stabilized) image display device, and is itself rotatable in elevation relative to a platform 16 rotatable in azimuth. The apparatus is normally carried by a vehicle and movements thereof cause servo responses of the mechanism 22 to stabilize the mirror and follow-up movements of the housing and pedestal 16 restore the mirror to the center of its limited motion in the housing. However, changes in elevation angle of the reflector cause rotation of the remote image about the center of its field of view and motion induced changes can rapidly lead to motion sickness in an observer of the image. The improvement of the invention consists of introducing an elevation offset between the mirror and the housing so that the sensor is offset about axis 18 and has essentially the same field of view from the mirror but the image formed is rotated about its receptive axis 20. The image rotation is equal to the elevation offset of the housing/sensor and is applied as a demand signal into the housing elevation-restoring feedback loop.

5 Claims, 2 Drawing Figures

SIGHTLINE STABLISATION APPARATUS

This invention relates to sightline stabilising apparatus containing an image sensing device having a field of view by way of a stabilised steerable reflector and producing a representation of the sensed image on a remote image display device, and in particular to producing rotation of the image representation on the display device.

There are numerous variants of sightline stabilising systems which may use visible or non-visible optical radiation or microwave radio frequency radiation but one form, comprising optical elements and carried by a host vehicle, with which the present invention is particularly concerned is described hereinafter with reference to FIG. 1. The essential features of such apparatus which make it applicable to the improvement of the present invention are a gyro-stabilised reflector, pivotable at least about one axis in space, and an image sensor having a field of view extending by way of the reflector, said sensor being pivotable about said one, or a parallel, axis relative to the reflector.

In sightline stabilising apparatus of the type referred to it is sometimes desired to introduce rotational displacement of the displayed image, often to cancel out rotation of the vehicle carrying the stabilising apparatus.

Within such a vehicular environment wherein the elevation control is constantly varying in an oscillatory manner, the corresponding rotational oscillation of the sightline image on the display device can quickly lead to fatigue or motion-sickness in an operator.

It has been proposed to rotate the display image by incorporating movable optical mechanisms such as a Dove prism, K-prism or the like within the optical paths. Such additional movements require additional positioning servomechanisms to align the elements concerned for the desired rotation and the introduction of the components of the servomechanisms, and possibly additional optical elements, create problems in respect of the space required and with maintaining accuracy of image alignment.

It is an object of the present invention to provide a method of, and apparatus for, enabling image rotation in a sightline stabilising system of the type referred to which is less complex than, and mitigates the disadvantage of, known methods or apparatus.

According to a first aspect of the present invention sightline stabilising apparatus including a gyro-stabilised reflector, pivotable at least about one axis in space, and an image sensor, having a field of view extending by way of the reflector, said sensor being pivotable about said one, or a parallel, axis relative to the reflector, is characterised by image rotation means responsive to a rotation demand input signal to superimpose an angular displacement of the sensor, about its axis, relative to the reflector of the same magnitude as the desired image rotation said displacement being maintainable in addition to subsequent relative movements between the sensor and reflector.

According to a second aspect of the present invention a method of effecting image rotation in sightline stabilising apparatus having a gyro-stabilised reflector, pivotable at least about one axis in space, an image sensor, having a field of view extending by way of the reflector, said sensor being pivotable at least about said one, or a parallel, axis relative to the reflector, and a remote image display device, is characterised by superimposing on the apparatus an angular displacement of the sensor about its axis with respect to the reflector equal to the desired image rotation angle.

The improvement of the present invention enables a physiologically beneficial effect to be introduced by very little modification of existing and already complex apparatus, and avoids major redesign of the apparatus which has hitherto been considered the only way to eliminate the image rotation effects.

Figure 2:
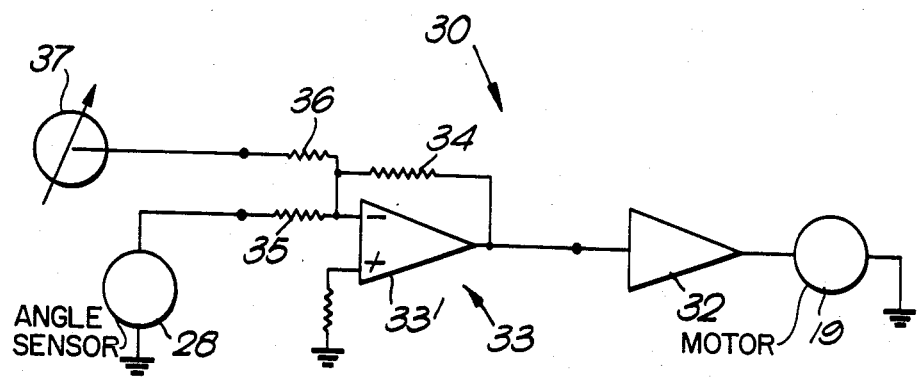

An embodiment of the present invention will now be described by way of example with reference to the accompanying drawings, in which:

FIG. 1 is a partly cut-away perspective view of sightline stabilising apparatus of the type referred to in this specification improved in accordance with the present invention, and FIG. 2 is a simplified circuit diagram of a portion of the servomechanism loop relating the elevation movements of the mirror and housing of the apparatus of FIG. 1 in accordance with the present invention.

Referring to FIG. 1 the sightline stabilising apparatus 10 is in general known and typical of the many variants on such apparatus. It is carried by a vehicle (not shown) to which it is secured by a pedestal base 11 extending in a nominally vertical plane and carrying thereon supported by a gimbal bearing 12 a pedestal platform 13. The pedestal platform 13 is rotatable in azimuth about an axis 14 along the pedestal by a pedestal motor 15.

A plate structure 16 extends orthogonally to the plane of the platform 13, that is, in said nominally vertical plane parallel to the rotation axis 14, and carries a housing 17 supported in an elevation gimbal bearing 17'. The housing is rotatable in elevation about a nominally horizontal elevation axis 18 by an elevation motor 19.

The housing 17 contains optical imaging means 20, such as television camera tube, mounted so that the normal incidence, or receptive, axis 21 extends parallel to the elevation axis 18 of the housing.

The housing 17 also contains a reflector mechanism shown generally at 22. The reflector mechanism comprises a base 23 fixed to the housing on the elevation axis 18 and a body portion 24 rotatable with respect to the base 23 about the elevation axis 18 or one parallel thereto. The body portion 24 supports reflector comprising a plane mirror 25 which is pivotable relative to the body about an axis 26, orthogonal to the elevation axis, by way of drive motor and linkages (omitted for clarity).

The body portion 24 of the reflector mechanism contains gyro means 27 which is sensitive to rotation of the housing/reflector mechanism about the axes 18 and 26 and is associated with angle sensing means by which the magnitudes of such rotations are provided as electrical signals in order to rotate the mirror about axes 18 and 26 by servo control of the above mentioned rotational drive motors and linkages. Angle sensing means 28 provides an electrical signal related to the angular relationship about the elevation axis 18 between the reflector mechanism body portion 24 and the housing 17. The rotational position in elevation of the housing 17 with respect to the pedestal platform 13 is also measured by angle sensing means (not shown) as is the rotational position in azimuth of the pedestal platform 13 with respect to the pedestal base 11 and the host vehicle.

The mirror 25 is positioned in nominally the same (vertical) plane as the azimuth rotation axis and inclined at 45° to the sensor receptive axis 21 such that the sensor 20 has a field of view defined along an axis (the sightline) 29 extending orthogonally to the elevation axis 18 by way of a window (not shown) in the housing 17.

The various angle sensors are coupled to the motors in servo loops for nulling rotation they sense. The reflector mechanism functions as a primary positioning system i.e. positions the mirror in response to the detection of rotation by the gyro means such that the mirror alignment is maintained with respect to the gyro orientation. The extent of accurate positional movement of the mirror and body portion with respect to the housing is of course limited and the housing and pedestal platform servos act as a follow-up system so that the mirror is effectively restored to a central position in respect of its ability to move relative to the housing about axes 18 and 26.

In order to steer the system to alter the field of view torquing signals are applied to the gyro means such that the gyro means takes up a new orientation or external demand signal are fed into the mirror servo loops. The servo loops cause the mirror to respond followed by the housing and pedestal thereby restoring the position of the mirror with respect to the housing in its new position. The system thus far described is conventional in its form and functioning.

As an effect of such conventional functioning in which the mirror and image sensor are rotated about elevation axis 18 the image as displayed to the operator appears rotated about axis 21. Such an image is rotated in the opposite sense, that is, de-rotated, in accordance with the present invention, by maintaining the mirror in elevation in relation to the desired sightline and rotating the housing 17, containing the image sensor, relative thereto about the elevation axis 18, for example, to the position 20' shown by broken lines. The sensor still observes substantially the same field of view by way of the mirror but has rotated relative to the axis 18 with a consequent rotation of the image at the sensor. The extent of image rotation is directly proportional to the relative angular displacement between the mirror and housing and this relative displacement is superimposed upon the normal follow-up servo action between the reflector mechanism 22 and the housing 17 by means of a demand signal of the correct sense and magnitude added to the servo loop 30.

FIG. 2 shows a simplified circuit diagram of the servo-loop 30 controlling the housing elevation.

Angle sensor 28 produces a signal having a magnitude proportional to the angular displacement between the reflector mechanism body and the housing 17. This signal is normally passed directly to a servo gain, shaping and power amplifier 32 which provides a power signal to the elevation motor 19 which in turn causes rotation of the housing in such a sense that the signal produced by the angle sensor 28 is reduced to zero, that is, the housing elevation follows that of the mirror as determined by the gyro means.

In accordance with the present invention a summing amplifier 33 is included in the servo-loop, comprising an operational amplifier 33' having a gain-defining feedback resistor 34 and imput resistor 35 to receive the signal from the angle sensor 28. A second input resistor 36 is connected to a variable voltage source 37 which provides a manually settable voltage level representing the demanded image rotation.

In order to introduce rotation of an image (which may, in fact be an operation to cancel an undesired rotation due to motion of the host vehicle) the rotation demand signal is applied to the housing elevation servo loop, the sense of the signal causing rotation in the direction required to produce the desired sense of image rotation.

In relation to the original sightline elevation it will be seen that provided the rotation demand signals setting the reflector mechanism and housing elevation offset remain unchanged the stabilisation system functions normally with the addition of the image rotation.

It will be appreciated that the image rotation demand signal may be manually set, as described above, or may be provided automatically in response to condition changes. For instance an additional gyro may be incorporated into the reflector mechanism or the gyro means 27 provided with a further axis of freedom to detect rotation of the elevation axis itself which could give rises to an unwanted image rotation. The output of such a gyro sensor provides rotation demand signals and effectively 'de-rotates' the image remotely received. Alternatively image processing techniques may be applied to the displayed image to determine the degree of rotation required to place or maintain the displayed image in a desired orientation.

It will be appreciated that the housing and pedestal servos need not be slaved to the mirror mechanism as described above. The servo loops may be run with built in offsets or responsive to system variables as required but by a suitable choice of rotation demand signal form, magnitude and sense an image rotation can readily be superimposed upon the other functions, limited only by the extent of relative rotation possible between the reflector mechanism 22 and the housing 17.

It will be appreciated that the axes about which the sensor 20 and reflector rotate need not be coincident as described above but merely parallel.

It will also be appreciated that the axes defined in the embodiment and claims, i.e. azimuth and elevation, are nominal only and provide convenient labels to aid an understanding of the apparatus. They may in practice comprise any directions in three dimensional space as long as the relationships between them are maintained.

Clearly the same principles may be embodied in appropriate form with other stabilising or steering systems having the relevant relatively movable components and whilst the above description shows which features are essential in such apparatus. It will be appreciated that such apparatus is not restricted to the production of two-dimensional images in visible radiation. Such systems may for example produce line images which are subsequently scanned in a transverse direction, may utilise infra red or longer wavelength optical radiation or may even be of analogous form operating with imaging millimeter or microwave equipment.

What is claimed is:

1. Sightline stabilising apparatus, adapted to be carried by a vehicle, comprising a housing rotatable about an axis with respect to the vehicle and including a gyro-stabilised reflector, capable of limited pivotable displacement with respect to said housing about said axis to maintain its orientation in space, and an image sensor, fixed with respect to said housing, having a field of view extending by way of the reflector and centered on a sensitive axis extending in said housing in the same direction as the rotation axis of said housing, said apparatus also comprising an image display device remote from the housing arranged to receive signals from the image sensor, follow-up servo means responsive to gyro induced displacement of the reflector from a predefined position with respect to the housing to cause said housing to be moved with respect to the vehicle to follow said reflector movement and null the displacement between reflector and housing, and image rotation means including means for producing a rotation demand input signal defining an angular displacement, corresponding to a demanded image rotation, about said axis between the reflector and the housing and means responsive to said rotation demand input signal to override said nulling operation of the follow-up servo means to maintain said angular displacement during subsequent motion of the reflector and housing.

2. Apparatus as claimed in claim 1 including signal injection means operable to add a signal representing the demanded degree of image rotation to the follow-up servo means.

3. Apparatus as claimed in claim 1 in which said one axis of housing rotation is an elevation axis and including reflector elevation axis sensing means operable to measure rotation of the elevation axis in elevation and provide a signal representing the demanded degree of image rotation.

4. A method of effecting a demanded image rotation in sightline stabilising apparatus carried by a vehicle, the apparatus having a housing pivotable about an axis with respect to the vehicle and containing a gyro-stabilised reflector, pivotable about said axis with respect to the housing to maintain its orientation in space, and an image sensor having a field of view extending by way of the reflector and centered on a sensitive axis extending in said housing in the same direction as said axis about which the housing is pivotable, the stabilising apparatus including a remote display device and follow-up servo means responsive to gyro-induced displacement between the reflector and housing from a defined positional relationship, due to motion of the vehicle in space, to cause said housing to be pivoted with respect to the body to null the displacement and restore said defined positional relationship, said method comprising defining said demanded image rotation as a positional displacement about said axis between the reflector and the housing, corresponding to the demanded image rotation, and causing the follow-up servo to null subsequent relative displacements between the reflector and the housing to said defined positional displacement.

5. A method as claimed in claim 4 comprising injecting into the follow-up servo system a signal of such magnitude as to add said positional displacement of the housing with respect to the reflector corresponding to the angle of demanded image rotation.

* * * * *